Aug. 28, 1973  KAZUO WATANABE  3,755,526

METHOD OF FORMING THERMOPLASTICS

Filed June 11, 1971  2 Sheets-Sheet 1

INVENTOR.
*Kazuo Watanabe*

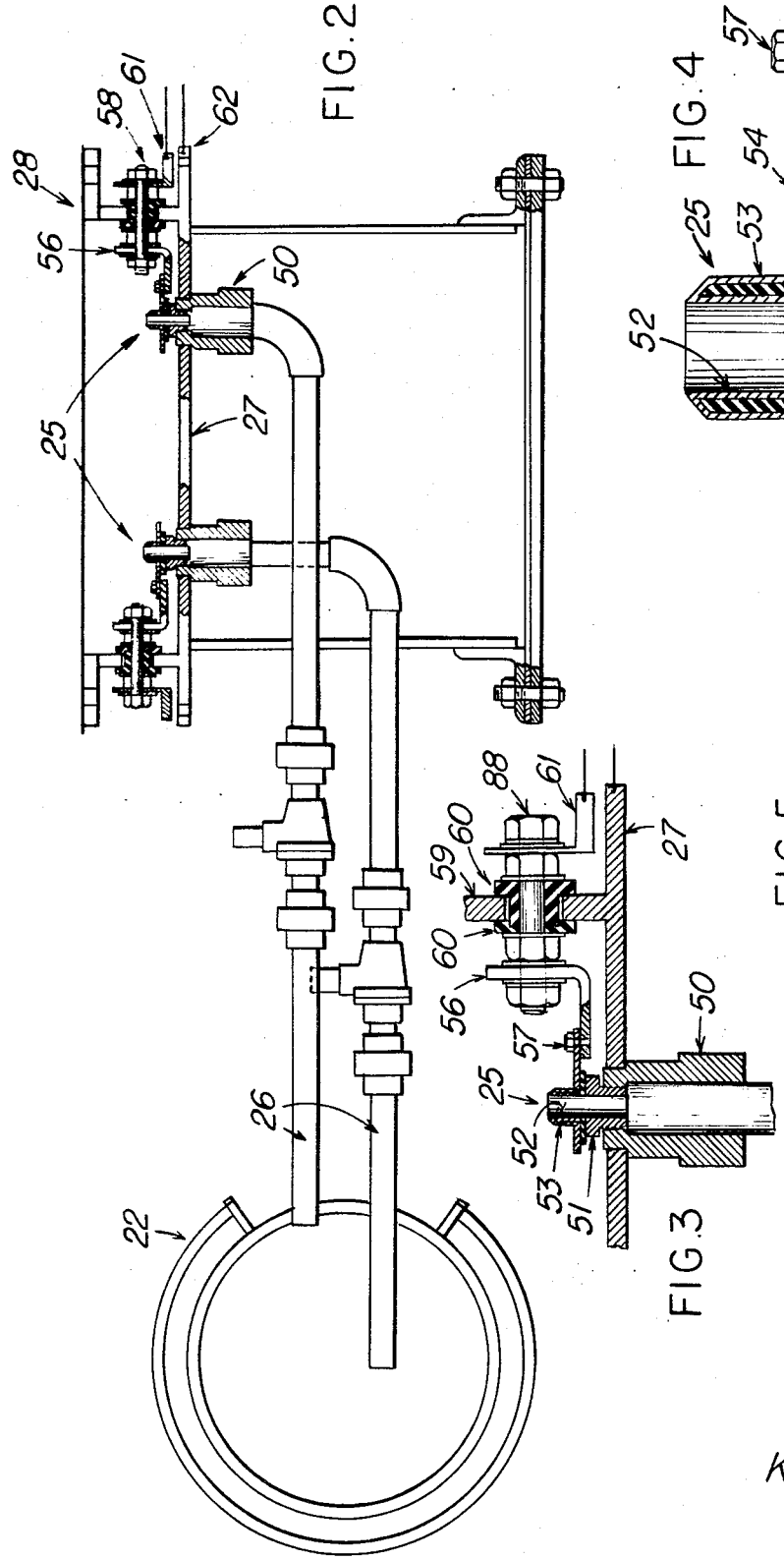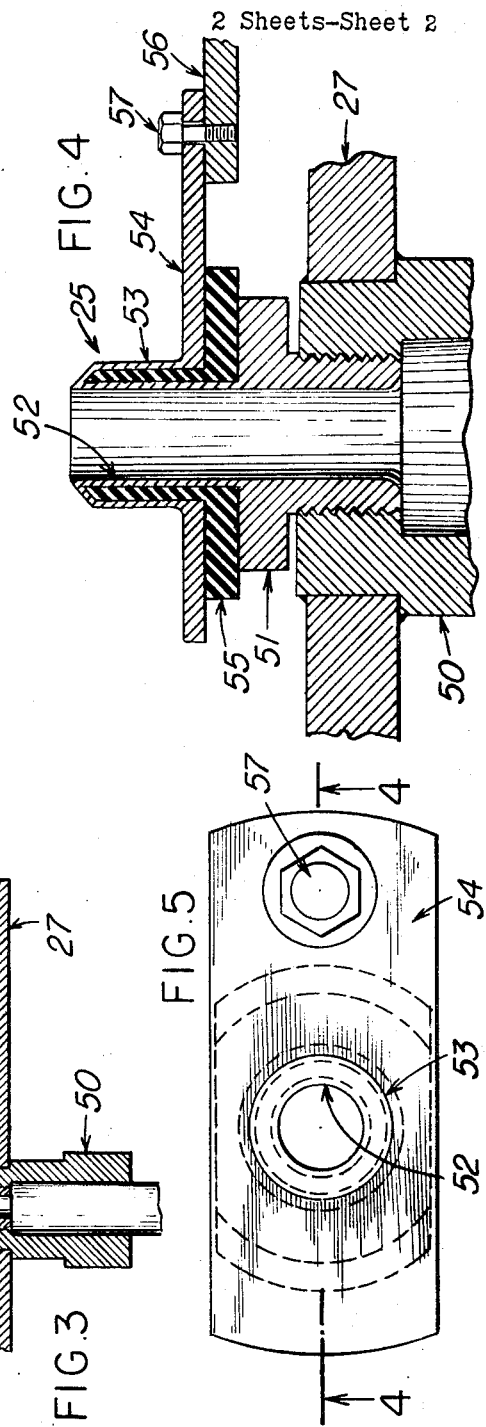
INVENTOR.
Kazuo Watanabe

United States Patent Office 3,755,526
Patented Aug. 28, 1973

3,755,526
METHOD OF FORMING THERMOPLASTICS
Kazuo Watanabe, Yokohama, Japan, assignor to
Mobil Oil Company
Filed June 11, 1971, Ser. No. 152,133
Claims priority, application Japan, July 1, 1970,
45/56,885
U.S. Cl. 264—178 F    9 Claims

ABSTRACT OF THE DISCLOSURE

Apparatus and process are described for forming thermoplastic materials into rods for shipment and use in hot melt coating equipment. The system of extrusion through electrically heated nozzles to a water bath is particularly applicable to hot melts which are blends of petroleum waxes and polymeric materials, which blends have relatively high melting point and tensile strength.

BACKGROUND OF THE INVENTION

(1) Field of the invention

Hot melts for use as coatings are often prepared by blending petroleum waxes and polymeric materials in order to provide glossy, tough coatings to the surfaces of food and other packages. A typical hot melt for such purposes may be a blend of paraffin wax, atactic polypropylene, and a copolymer of ethylene with vinyl acetate.

Such hot melt blends have relatively high melting points. They can be damaged by overheating, particularly in the presence of air. For this and other reasons the reservoir of molten hot melt in a coating machine is maintained at temperature only moderately above its melting point.

Fresh hot melt compositions in the solid state are difficult to introduce as large blocks which melt slowly at the temperature of the coating machine reservoir. It is therefore desirable to supply the hot melt composition as small pieces.

Particularly when using hot melts of the tougher grades, a large block cannot be broken up easily. Chipping results in irregular pieces which involve difficulty in handling. Some of the more brittle types of hot melts tend to form excessive fines and dust upon handling.

(2) Description of the prior art

Various methods for the production of granular thermoplastic materials have previously been proposed. For example, U.S. Pats. Nos. 2,862,243; 3,436,449 and 3,271,821 describe methods involving the extrusion of a thermoplastic melt into a bath of water through a die beneath the surface of the water. As the material is extruded it is chopped into short lengths by a cutter at the face of the die. As the material is still plastic at this point, it forms granules with curved surfaces, which are free-flowing and can be easily handled.

U.S. Pat. No. 3,060,510 describes a different method for producing granules of thermoplastic material. In this method, the molten material is extruded through a die into a bath of liquid which is at a temperature above the melting point of the material. As the material passes through the liquid it breaks up into spherical particles which are cooled and quenched in the cooler regions of the liquid. One way in which the method can be operated is to extrude the material so that it flows upwards through the liquid. In this case, the material must be sufficiently buoyant to rise to liquid surface.

Other methods of forming granules of thermoplastic materials are described in U.S. Pats. Nos. 3,288,892; 3,372,215 and 3,519,706. The method described in U.S. 3,288,892 is similar to that described in the first three patents referred to above in that the molten material is cut into granules as it is extruded from the die. In this case, however, the granules are cooled in air rather than water. The methods described in U.S. 3,372,215 and U.S. 3,519,706 both involve chopping a cooled, solidified strand of the thermoplpapstic material although the former also describes a die-face cutting technique.

U.S. Pats. Nos. 2,887,724 and 2,908,041 describe spray techniques for producing granular particles of fusible materials. In the processes described in these patents, the molten material is sprayed into air so as to break the liquid stream into droplets which then solidify as granules.

One of the difficulties which has been encountered in the methods involving the extrusion of a thermoplastic material directly into a liquid cooling bath is that the material tends to congeal and solidify immediately it comes into contact with the liquid. This tends to plug the die nozzle.

One way of alleviating this problem is referred to in U.S. 3,436,449, above. This comprises providing an insulating washer between the conduit leading to the die face and the die face itself. However, it should be noted that the emerging material will still be subject to cooling at the surface of the die where it meets the liquid. The use of an insulated die face is also described in U.S. Pat. No. 3,230,582.

Heating devices for extruders have been described in U.S. Pats. Nos. 2,179,968 and 2,688,153. In these patents the heating takes place a considerable distance from the nozzle of the die so that, even if the material is adequately heated during its passage through the extruder, it may still be subject to undesirable cooling in the actual nozzle of the extruder.

U.S. Pat. No. 2,955,320 describes a multifilament extruder with an electrically heated die plate. The die plate is, however, intended for spinning thin thread filaments about 1 mm. in diameter. The die plate, being comparatively thin, would be unsuitable for extruding substantially thicker filamentary products.

SUMMARY OF THE INVENTION

This invention provides means for forming uniform pieces of hot melt composition from a molten mix of the blend by extrusion through an electrically heated nozzle into the bottom of a two stage water bath. The first stage, hereinafter referred to as the "hot bath" is maintained at a temperature substantially below the melting point of the blend and substantially above ambient temperature. In the hot bath the strands of hot melt are congealed by cooling at a sufficiently low rate to avoid spalling of the surface or formation of hollow tubes similar to macaroni.

After initial relatively slow cooling in the hot bath, the strands are passed to a second stage (hereafter referred to as the "cold bath") maintained at substantially lower temperature, about room temperature. The strands are here congealed to an extent necessary for chipping into short length without the core of the strand flowing.

The electrically heated nozzle which is used for the extruding comprises an electrically conductive conduit, which is connected at its opposite ends to electrically conductive members to which suitable connections may be made. The composition which is to be extruded passes along the conduit, during which time, it is heated by contact with the conduit walls which are electrically heated. As the composition has to pass through a substantial length of heated conduit, it becomes evenly heated throughout.

BRIEF DESCRIPTION OF DRAWINGS

FIG. 2 is an enlarged illustration, partly in section, of the extrusion nozzles used in the apparatus of FIG. 1, together with the associated manifold, FIG. 3 is a vertical sectional illustration of the extrusion nozzle of FIG. 2 and its associated electrical connections, FIG. 4 is a vertical sectional illustration, on an enlarged scale, of the extrusion nozzle, and FIG. 5 is a plan view, on an enlarged scale, of the extrusion nozzle.

DETAILED DESCRIPTION OF THE INVENTION

Figure 1:
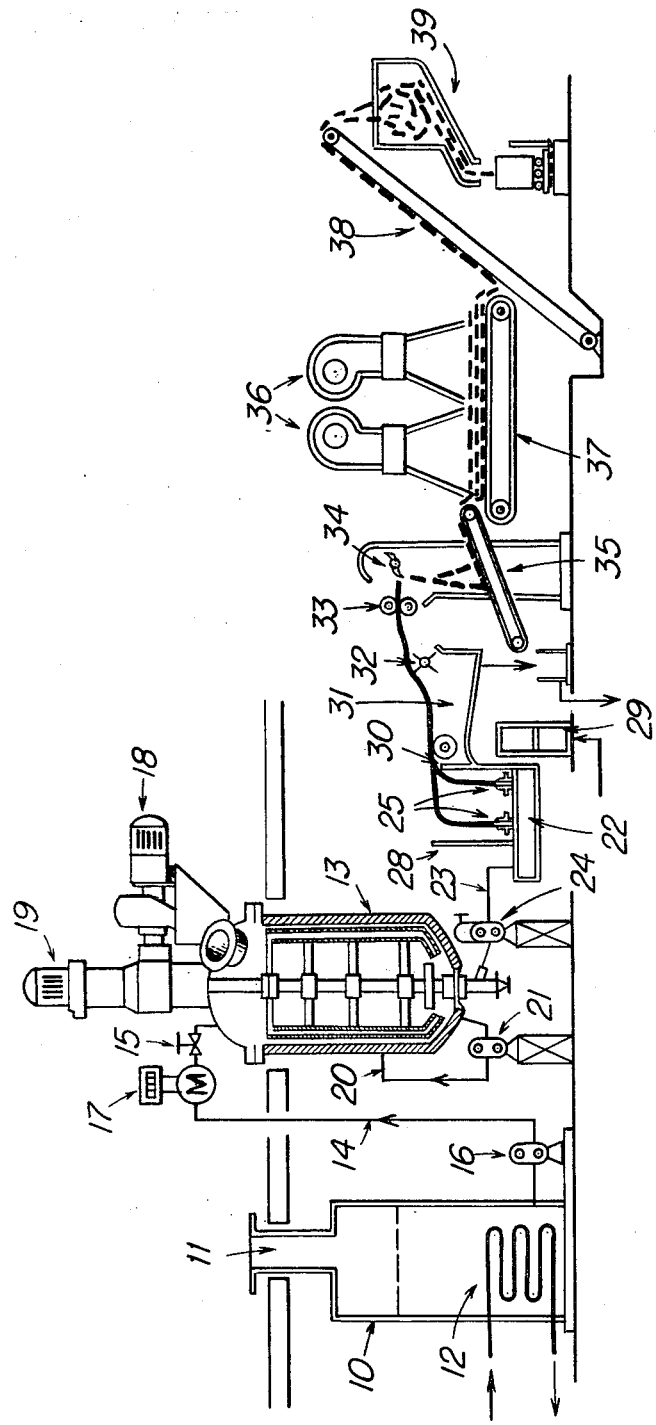
FIG. 1 is a schematic illustration of the extrusion apparatus used for forming the rods of thermoplastic material.

Hot melt compositions are materials which become molten at elevated temperatures. Included within this class of materials are the coatings, adhesives and impregnants, which are normally solid at room temperature and liquid at elevated temperatures. They can be applied to substrates as hot liquids without the addition of volatile liquids.

The hot melt compositions which are generally in use fall mainly into two classes, namely, those based on waxes, usually petroleum waxes, and those based on thermoplastic polymers. The present process is mainly applicable to the wax-based compositions, but it may also be used with the others. Thus, it may be used for thermoplastic materials such as olefin polymers, including polyethylene, polypropylene and polybutene, and polymers of other unsaturated monomers, including styrene, acrylic acid, acrylic acid esters such as methyl acrylate and ethyl acrylate, methacrylic acid, methacrylic acid esters such as methyl methacrylate and ethyl methacrylate, acrylonitrile, and other polymeric materials such as polyamides, polyesters such as polyethylene terephthalate, polyurethanes and polyureas.

Hot melt compositions based on petroleum waxes usually contain a major proportion (at least 40%, more usually at least 50% by weight) wax, and minor amounts of modifiers such as thermoplastic polymers. Compositions of this type are widely used as coatings for packaging materials such as paper and cardboard. They render the material water resistant and because they are thermoplastic, they can be heat sealed.

The waxes which may be used in the hot melt compositions include paraffin wax, ozocerite, ceresin, and microcrystalline wax. Paraffin wax will normally be the major component. If desired, more than one wax may be present, for example a blend of paraffin and microcrystalline wax.

Modifiers which may be present include, besides the waxes mentioned previously, thermoplastic polymers and naturally-occurring resins. Preferred polymers which may be used include polyolefins such as polyethylene, polypropylene and polybutene; polymers of other unsaturated monomers such as vinyl acetate, ethyl acrylate, methyl acrylate and methyl methacrylate; copolymers such as ethylene/vinyl acetate, ethylene/propylene, ethylene/acrylic acid, ethylene/methyl acrylate, ethylene/methyl methacrylate, ethylene/ethyl acrylate and copolymers of ethylene and unsaturated dicarboxylic acids such as maleic acid and their anhydrides. Graft copolymers of ethylene and maleic anhydride are particularly useful.

Other additives such as anti-oxidants, for example, 2,6-ditertiarybutyl-p-cresol, 2-tertiarybutyl-4-hydroxyamisole or 3-tertiarybutyl-4-hydroxyamisole, slip additives such as oleyl amide, erucamide, oleyl palmitamide and stearyl erucamide. Naturally-occurring products such as rosin may also be present.

Hot melt compositions particularly useful in coating carton stocks are characterized by good heat seal characteristics, good adhesion to the stock, good initial gloss and gloss retention, and low viscosity at coating temperatures so that they can be used in conventional coating machinery. Particularly preferred hot melt coating compositions are described in U.S. Pats. Nos. 3,322,709; 3,440,194, and 3,362,839.

Althugh the process is useful with a wide variety of hot melt compositions, having viscosities of from 20 to 20,000 centistokes at 120° C. (250° F.), it is particularly useful with the tougher grades of compositions. These grades are characterized by a comparatively high melting point and a comparatively high content of polymeric modifier (usually up to about 45%). It has been found that the tougher the composition is, the easier the process is to work because the operating conditions are not then so critical as with the softer grades of composition.

The tougher grades of composition with which the process is primarily useful are characterized by a relatively high viscosity. Generally, the tougher grades have a viscosity of over 400 centistokes at 120° C., more commonly over 1000 centistokes, even going as high as 10,000 or 20,000 centistokes. Typical products have viscosities of 400–500, 1200–1600, 1400–2000, 3500–4500, 10,000–14,000 centistokes at this temperature. The softer grades have viscosities of about 20 to 100 centistokes at 120° C. Accordingly, the present process is especially suitable for use with hot melt compositions having a viscosity of at least 400, preferably at least 1,000 centistokes at 120° C.

In the process according to the invention, the hot melt composition is melted and then extruded through a heated nozzle directly into a hot bath. The ingredients for the composition can be melted and blended together in any convenient manner. For example, the various ingredients can be introduced into a hot bath to melt them and then fed into a blending kettle in which they are thoroughly mixed together. The composition will normally be blended at a temperature substantially above its melting range and preferably, substantially above its extrusion temperature. Temperatures from 80° to 160° C., preferably 100° to 135° C., are normally used for the blending operation. If the melt temperature is too low, the various feed lines may become plugged and if it is too high, the temperature of the extruded strand may become too high, with the result that the strand may break or its diameter will not be even.

The molten composition is then fed to a heated extrusion nozzle from which it is extruded directly into a hot bath. The construction of the nozzle is such that the temperature of the extruded composition can be accurately controlled. The nozzle is usually placed at the bottom of the bath as a matter of convenience but other positions can be used, provided that the extruded composition enters the liquid directly from the nozzle.

The liquid in the bath is normally water, but other liquids may be used, if desired. The requirements are that the liquid should not dissolve the composition to a substantial extent, should have suitable melting and boiling points and should not adversely affect the extruded composition.

The hot bath is maintained at a temperature substantially below the melting point of the composition and substantially above ambient temperature. The temperature can, if necessary, be controlled by heating or cooling coils in the bath or by adding fresh liquid at a suitable temperature. As the composition enters the bath at a temperature substantially above the bath temperature, heat will be supplied as the strands are cooled. It will therefore normally be necessary to add cold water to the bath in order to maintain the desired temperature. At start-up, on the other hand, it may be necessary to add hot water or steam to obtain the desired temperature.

As the composition enters the bath it starts to cool, from the outside towards the centre. In order to ensure satisfactory operation, both the extrusion temperature and the bath temperature should be carefully controlled. If the extrusion nozzle temperature is too low, the composition tends to stick to the nozzle tip. If, on the other hand, it is too high, the extruded strands will be too fragile and may break. This will form a product consisting of granules or short sticks instead of continuous strands. This may also happen if the temperature of the bath is too high. If the bath temperature is too low, the skin of the strand tends to separate from the core to form hollow tubes rather than solid strands. Suitable extrusion nozzle temperatures are from 100° to 150° C., usually 110° to 130° C. Bath temperatures generally range from 20° to 60° C., preferably 25° to 35° C.

The exact choice of operating temperature for the nozzle is dependent largely upon the viscosity of the composition. The tougher grades of composition have comparatively high viscosities and correspondingly high strengths when extruded. The softer grades, on the other hand, are less viscous at extruding temperatures and are accordingly weaker. In general, therefore, the softer grades require a lower extrusion temperature than the tougher grades.

If a product consisting of granules or short sticks is desired, the process may be operated with higher melt and extrusion temperatures. The extruded material then breaks up in the hot bath into short lengths or granules, depending on the temperature. In general, the production of granules is favored by the use of the higher temperatures within the range. The particulate product then floats to the surface of the hot bath from which it can be conveyed to cold bath by a star paddle or belt. It can be removed from the cold bath by a similar device and then dried, as required.

The temperature of the water will, of course, be different at different positions in the bath. The normal tendency is for it to be hotter in the region of the nozzle, although the effects of convection currents and of any forced circulation may tend to offset this. The temperatures specified above are the temperatures prevailing in the zone around the nozzles. The temperature should be maintained even throughout this zone in order to produce a product with consistent properties.

As the extruded strands pass through the hot bath they cool slowly and the thickness of the solid skin on the outside of the strand increases until it can be safely handled. However, it still has a liquid or semi-liquid core which enables it to be bent without snapping. A suitable balance of properties can be obtained by regulating the bath temperature and the duration of the hot bath treatment.

Normally, the strands will be passed upwards through the bath because the buoyancy of the hot melt compositions causes them to rise to the surface. However, it would also be possible to pass the strands through the bath sideways or even in a downward direction (with suitable guides).

After the strands have passed through the hot bath, they enter a cold bath. The purpose of the cold bath is to quench the strands completely so that they are completely solidified. For this purpose, the temperature of the cold bath is set substantially below that of the hot bath. Excessively low temperatures should, on the other hand, be avoided because they make the strands too brittle for easy chopping. In addition, the drying is assisted by not having excessively low temperatures. Accordingly, the temperature of the cold bath will normally be in the range of 5° to 30° C., preferably 10° to 30° C., e.g., 20° C. As with the hot bath, the preferred liquid for the cold bath is water.

The continuous strands are then passed from the cold bath to a chopper which cuts the strands in short lengths. The chopped strands can then be dried, suitably by a hot air dryer.

The finished product comprises rod-like lengths of the hot melt composition, which can be easily handled and packaged. As the pieces are small they can be easily fed into the reservoir of conventional coating machines. The pieces melt quickly and there is no need to break them up further.

A suitable apparatus for carrying out the process is illustrated in the drawings. Referring to FIGS. 1 and 2, a hot bath 10 with inlet 11 has a steam heating coil 12. The bath 10 is connected to a steam jacketed blending kettle 13 by means of a conduit 14, a valve 15, and a gear pump 16. A flow rate meter 17 is installed in the conduit to monitor the feed rate of the composition. The outer and inner paddles of the kettle are driven by motors 18 and 19, respectively. A circulating loop 20 is provided with a gear pump 21 for circulating the composition.

The blending kettle 13 is connected to a steam-jacketed extrusion manifold 22 by means of a conduit 23 and gear pump 24. The manifold 22 is connected to a number of extrusion nozzles 25 by means of conduits 26. The nozzles 25 are set in the bottom plate 27 of a hot bath tank 28. The nozzles are electrically heated and for this purpose are supplied with alternating current from a current source 29. The nozzles are arranged in rows across the tank bottom, with a number of nozzles connected to each conduit from the manifold. For clarity in the drawings, however, only a limited number of nozzles and conduits have been shown. At the top of tank 28 is a weir 30 which separates the hot bath tank 28 from a cold bath tank 31. At the opposite end of cold bath tank 31 is a star paddle 32 for advancing the strands to chopper rolls 33 and the chopper 34. Under the chopper is a conveyor belt 35 which conveys the chopped strands to a hot air dryer station, equipped with hot air hoods 36 and a conveyor belt 37. The dried, chopped strands are removed from the dryer by means of belt 38 which conveys them to a packaging station 39.

In operation, the ingredients of the hot melt composition are melted in tank 10 and then pumped to blending kettle 13 in which they are thoroughly blended. If the melt is kept in the kettle for a long time, nitrogen or carbon dioxide blanketing should be used to prevent degradation of the composition.

The molten composition is then extruded through the extrusion nozzles 25, with sufficient pressure being supplied by pump 24. The composition passes upwards through the hot bath tank 28 in the form of continuous strands which are led over the weir 30 into the cold bath tank 31. If desired, suitable advancing rolls may be placed on one or both sides of the weir in order to assist the forward movement of the strands.

Rolls covered with rubber, preferably corrugated, are suitable for this purpose. The water inlets to the bath can be arranged so that the incoming water pushes the strands together towards the centre line of the bath. The strands are still relatively fragile while they are in the hot bath and because of this, it is desirable to avoid any strong currents in the liquid, particularly in the extrusion zone where the strands are weakest. If necessary, baffles should be fitted over inlets to the tank. As the strands are comparatively stronger by the time they enter the cold bath tank, precautions of this type are not as important in the cold bath tank.

As the strands leave the cold bath tank, they can be subjected to an air blast to remove any water adhering to them. For this purpose, they may be transported out of the cold bath tank on a conveyor belt rather than a star paddle, as shown. Any broken pieces of the strands can be allowed to flow over the edge of the tank onto the conveyor belt 35, to join the chopped pieces of strand.

The construction of the extrusion nozzles is shown in detail in FIGS. 3 to 5 of the drawings. The bottom plate 27 of the hot bath tank 28 has an adaptor 50 into which the nozzle 25 is screwed. The nozzle has a metal body portion 51 which is joined to a thin, annular conduit portion 52, also of metal. The two portions may be integral or joined, as by welding. A second, thin annular member 53 is joined to the first at the end of the nozzle. Member 53 is joined to a heavy metal plate 54. The two annular members are separated by an insulator 55, which also separates the body portion 51 from plate 54.

The nozzle is heated electrically by applying a voltage between body portion 51 and plate 54. To this end, a strap 56 is screwed to plate 54 with a screw 57. Strap 56, in turn, is fixed to a current-carrying conductor stud 58 which passes through the side wall 59 of the tank 28. Stud 59 is insulated from the tank by bushings 60 and the electrical connection is made by means of a terminal 61.

The other electrical connection is made to the metal tank, which is grounded, at a terminal 62. The current then flows through the tank, the adaptor 50, the body portion 51 of the nozzle, the annular conduits 52 and 53, plate 54, strap 56 and stud 58. As the annular conduit 52 is of relatively small cross-section, it is heated by the passage of the heavy current which is used. Currents of from 30 to 130, more normally 9°–110 amperes at about 1 volt have been found suitable for maintaining satisfactory extrusion temperatures with nozzles having an internal diameter of 8 mm. and a thickness of 0.3 mm. for the annular metal conduits 52 and 53. 18–8 stainless steel is a suitable material for the metal parts of the nozzle.

The current used to heat the nozzle may be either direct or alternating. A particularly convenient way of controlling the current, and hence the nozzle temperature, is to use a step-down transformer with a suitable ratio (about 200:1 for a 200 v. supply) which is fed by a three junction silicon controlled rectifier (triac) whose D.C. gate voltage is manually controlled by a suitable variable resistance.

The insulating material may be a thermosetting plastics material such as phenol-formaldehyde or phenol-furfural resins, a ceramic material, mica or any other material with a suitable combination of high melting point and insulating properties. The insulating material need not extend up into the nose of the nozzle as shown, but may simply constitute a collar around the lower part of the nozzle conduit between the body portion and the top plate. However, as the metal of the conduit is relatively thin and may deform under working conditions, the use of a suitably shaped insulating support is preferred.

Heat is, of course, lost from the outer heated part 53 of the nozzle. This can be avoided by using a construction without such a long projecting tip. The tip may be made shorter or dispensed with entirely so that the extrusion opening is flush with the surface of plate 54. In this case, a short projecting lip can be present, just protruding up around the nozzle opening. Alternatively, the thickness of the outer conduit 53 can be increased substantially so that it is no longer heated by the electric current to such a great extent. Thermal insulation could also be used to inhibit these heat losses. The thermal insulation may take the form of a collar surrounding the nozzle. The collar may be made of plastics material of suitably high melting point, mica or a ceramic material.

Although the nozzles have been shown with a circular cross section, other cross sections such as semi-circular, triangular, rectangular or polygonal may be used, depending upon the cross section desired for the extruded strands.

DESCRIPTION OF THE SPECIFIC EMBODIMENTS

Example 1

The manner in which readily usable rods can be formed from a hot melt blend characterized by high toughness is illustrated with respect to a blend of 55% 66° C. (150° F.) melting point paraffin wax, 25% ethylene/vinyl acetate to polymer (72:28 monomer ratio, melt index about 2.5–3.5) and 20% of a terpene polymer modifier (alpha pinene polymer, molecular weight about 850). This material has a viscosity of 3500 to 4500 centistokes at 100° C.

The blend was prepared by adding to a blending kettle equipped with paddle stirrers the amount of wax required for the blend and applying heat to melt the wax. Proper amounts of additives for stabilizing the blend against oxidative deterioration are added, followed by the resinous components, namely ethylene/vinyl acetate copolymer and the terpene polymer. The mixture was blended at about 160° C. and extruded through multiple nozzles of the type shown in the attached drawings at 120° C. using a direct current of one volt at 100 amperes per nozzle.

The resultant strands rose through a hot bath maintained at 30° C. and passed over a roller into a cold bath at 20° C. The cooled strands which now have the characteristic of continuous rods were passed to the chopper, drained of excess water then transferred to packaging.

In the operation just described, the nozzles had an internal diameter of 8 mm. resulting in a cooled finished product of about 6 mm. diameter cut to 7 cm. lengths.

This provides a dust free, easily handled product which melts with minimum delay for supply to a conventional coating machine.

Example 2

A blend of the same composition as in Example 1 was prepared using a melt temperature of 100°–110° C. The composition was extruded through multiple stainless steel nozzles of the type used in Example 1, at an A.C. current of 80 amperes at 1 volt. The bath temperature were respectively 30° and 20° C., as before.

The product possessed the same characteristics as that of Example 1.

Example 3

Example 1 was repeated, but using a melt blending temperature of 80°–115° C., a hot bath temperature of 30°–40° C., a cold bath temperature of 10°–30° C., and a nozzle current of 75 amperes.

The product had the same characteristics as in Example 1.

Example 4

A hot melt composition of the following ingredients was prepared:

| | Wt. percent |
|---|---|
| Paraffin wax, 150° F. melting point | 58 |
| Microcrystalline wax | 15 |
| Ethylene/vinyl acetate copolymer (82/18 monomer ratio, melt index 125–175) | 15 |
| Ethylene/vinyl acetate copolymer (72/28 monomer ratio, melt index about 350) | 7 |
| Polyethylene/maleic acid graft copolymer (M.W. 7,000) | 5 |

The blend was prepared as described in Example 1, with the usual addition of stabilizers and anti-oxidants. The melt blending temperature used was 80° C. The composition has a viscosity of about 400 centistokes at 120° C.

The melt was extruded through the same apparatus as in Example 1, using an A.C. current of 80 amperes at 1 volt for heating the nozzles. The temperature of the hot bath was 37° C. and the cold bath 20° C. The product was chopped and dried as in Example 1.

The product consisted of short strands which melted easily in the coating machine.

Example 5

Example 4 was repeated, but using a melt tank temperature of 85° C., a hot water bath temperature of 30° C. and a nozzle current of 80 amperes at 1 volt. The final product had the same characteristics as in Example 3.

Example 6

A hot melt composition of the following ingredients was prepared:

| | Wt. percent |
|---|---|
| Paraffin wax, 66° C. M.P. | 60 |
| Ethylene/vinyl acetate copolymer (77:28 monomer ratio, melt index 2.5–3.5) | 20 |
| Terpene polymer (alpha pinene polymer, M.W. about 850) | 15 |
| Ethylene/vinyl acetate copolymer (85:15 monomer ratio, low mol. wt.) | 5 |

The blend was prepared as described in Example 1, with the usual addition of stabilizers and anti-oxidants.

The melt blending temperature used was 80°–105° C. The composition has a viscosity of 1400–2000 centistokes at 120° C.

The melt was extruded as previously described, using a hot bath temperature of 30°–40° C., a cold bath temperature of 10°–30° C. and a nozzle current of 80–110 amperes at about 1 volt.

The product was chopped and dried and was found to be satisfactory in terms of ease and speed of melting in conventional machinery.

Example 7

A hot melt composition of the following ingredients was prepared:

| | Wt. percent |
|---|---|
| Paraffin wax, 59°–60° C. (138°–140° F.) M.P. | 45 |
| Eethylene/vinyl acetate copolymer (72:28 monomer ratio, melt index 2.5–3.5) | 25 |
| Pentaerythritol ester of hydrogenated rosin | 25 |
| Polyisobutylene | 5 |

The blend was prepared as described in Example 1, with the usual addition of stabilizers and anti-oxidants. The melt blending temperature used was 105° C. The composition has a viscosity of 10,000–14,000 centistokes at 120° C.

The melt was extruded as previously described, using a hot bath temperature of 25°–30° C., a cold bath temperature of 20° C. and a nozzle current of 100 amperes at about 1 volt.

The product was chopped and dried as previously described. Although this composition is very hard (as demonstrated by its high viscosity), the chopped, dried strands melted readily in a conventional coating machine.

Example 8

A hot melt composition of the following ingredients was prepared:

| | Wt. percent |
|---|---|
| Paraffin wax 59°–60° C. (138°–140° F.) M.P. | 62 |
| Microcrystalline wax | 22 |
| Polyethylene | 8 |
| Ethylene/vinyl acetate copolymer (82:18 monomer ratio, melt index about 150) | 8 |

The blend was prepared as described in Example 1, with the usual addition of stabilizers and anti-oxidants. The melt blending temperature used was 85° C. The composition had a viscosity of 350 centistokes at 120° C.

The melt was extruded as previously described, using a hot bath temperature of 30°, a cold bath temperature about 20° and a nozzle current of 60–80 amperes at 1 volt.

The product was chopped and dried as previously described. It melted very easily in a conventional coating machine.

Example 9

A hot melt composition of the following ingredients was prepared:

| | Wt. percent |
|---|---|
| Paraffin wax 59°–60° C. (138°–140° F.) M.P. | 56 |
| Microcrystalline wax | 30 |
| Ethylene/vinyl aceatte copolymer (82:18 monomer ratio, melt index about 2.5–3.5) | 14 |

The blend was prepared as described in Example 1, with the usual addition of stabilizers and anti-oxidants. The melt blending temperature used was 90° C. The composition had a viscosity 350 centistokes at 120° C.

The melt was extruded as previously described, using a hot bath temperature of 37° C., a cold bath temperature of about 20° C., and a nozzle current of 75–100 amperes at about 1 volt.

The product was chopped and dried. It melted easily in a conventional coating machine.

Now that the invention has been described, modifications will become apparent to those skilled in the art, and it is intended to cover such modifications as fall within the scope of the appended claims.

What is claimed is:

1. A method of forming uniform extrudates of a petroleum wax-based hot melt composition which melts at an elevated temperature and which comprises at least 40% by weight petroleum wax and up to 60% by weight thermoplastic polymer modifiers, the method comprising the steps of forming a molten blend of said composition at an elevated temperature, extruding said molten blend through a heated nozzle directly into a first liquid cooling bath, said nozzle being situated below the surface of the liquid in said bath, the liquid in said first liquid cooling bath being at a temperature of from 20° to 60° C. to form an extrudate, passing the extrudate through said liquid of said first liquid cooling bath, removing the cooled extrudate from said first liquid cooling bath, passing the extrudate to a second liquid cooling bath at a temperature from 10° to 30° C. and below the temperature of said first bath, to congeal and solidify said extrudate, and removing the congealed and solidified extrudate from said second liquid cooling bath.

2. The method of claim 1 wherein the blend is extruded as continuous strands.

3. The method of claim 2 wherein said congealed, solidified extrudate is dried and chopped.

4. The method of claim 1 wherein said hot melt composition comprises at least 50% by weight paraffin wax.

5. The method of claim 1 wherein said hot melt composition comprises at least 40% by weight of petroleum wax, up to 60% by weight polymeric modifiers, said composition having a viscosity of at least 400 centistokes at 120° C.

6. The method of claim 5 wherein said hot melt composition has a viscosity of at least 1000 centistokes at 120° C.

7. The method of claim 1 wherein the temperature of said first bath is from 25° to 35° C. and the temperature of said second bath is from 10° to 30° C. and below the temperature of said first bath.

8. The method of claim 1 wherein the composition is extruded at a temperature of from 100° to 150° C.

9. The method of claim 1 wherein said nozzle is heated by the passage of an electric current therethrough.

References Cited

UNITED STATES PATENTS

| 2,212,772 | 8/1940 | Graves | 264—178 F |
| 2,666,976 | 1/1954 | Olmer et al. | 264—DIG. 47 |
| 2,827,661 | 3/1958 | Kohorn | 425—71 |
| 3,051,992 | 9/1962 | Bradley | 425—71 |
| 3,205,186 | 9/1965 | Zaayenga | 260—28.5 AV |
| 3,322,708 | 5/1967 | Wilson | 260—28.5 AV |
| 3,389,428 | 6/1968 | Denti et al. | 264—178 F |
| 3,437,725 | 4/1969 | Pierce | 264—176 F |
| 3,448,185 | 6/1969 | Sims | 264—176 F |
| 3,516,120 | 6/1970 | Braun | 425—67 |
| 3,538,210 | 11/1970 | Gatto | 425—71 |
| 2,553,365 | 5/1951 | Ferris | 264—237 |
| 2,763,894 | 9/1956 | Bulkley et al. | 264—237 |
| 3,491,177 | 1/1970 | Johnson | 264—178 F |
| 3,622,657 | 11/1971 | North et al. | 264—237 |

FOREIGN PATENTS

| 611,844 | 10/1960 | Italy | 264—178 F |
| 41-9134 | 5/1966 | Japan | 264—178 F |
| 43-22332 | 9/1968 | Japan | 264—178 F |

JAY H. WOO, Primary Examiner

U.S. Cl. X.R.

264—148, 237; 260—28, 28.5

UNITED STATES PATENT OFFICE
CERTIFICATE OF CORRECTION

Patent No. 3,755,526    Dated August 28, 1973

Inventor(s) KAZUO WATANABE

It is certified that error appears in the above-identified patent and that said Letters Patent are hereby corrected as shown below:

Under title, "Mobil Oil Company" should be - - Mobil Oil Corporation - -. In column 2, line 4, "thermoplpapstic" should be - - thermoplastic - -. In column 3, line 73, "althugh" should be - - although - - . In column 7, line 10, "9o" should be - - 90 - -. In column 9, line 16, "Eethylene" should be - - Ethylene - -. In column 9, line 48, "350" should be - - 52 - -. In column 9, line 64, "aceatte" should be - - acetate - -.

Signed and sealed this 29th day of January 1974.

(SEAL)
Attest:

EDWARD M. FLETCHER, JR.
Attesting Officer

RENE D. TEGTMEYER
Acting Commissioner of Patents